United States Patent
Vogt et al.

[11] Patent Number: 5,968,597
[45] Date of Patent: Oct. 19, 1999

[54] PRINT-PATTERNED COAGULATED POLYURETHANE ON FABRIC SUBSTRATES AND ARTICLES MADE THEREFROM

[75] Inventors: Kirkland W. Vogt, Simpsonville; Shulong Li, Spartanburg, both of S.C.

[73] Assignee: Milliken & Company, Spartanburg, S.C.

[21] Appl. No.: 09/060,625

[22] Filed: Apr. 15, 1998

Related U.S. Application Data

[63] Continuation-in-part of application No. 09/042,922, Mar. 17, 1998.

[51] Int. Cl.⁶ ........................................................ B05D 3/02
[52] U.S. Cl. ........................................ 427/377; 427/389.9
[58] Field of Search .................................. 427/377, 389.9

[56] References Cited

U.S. PATENT DOCUMENTS

| | | | |
|---|---|---|---|
| 3,100,721 | 8/1963 | Holden | 117/135.5 |
| 3,208,875 | 9/1965 | Holden | 117/135.5 |
| 3,228,786 | 1/1966 | Fitzgerald et al. | 117/62 |
| 3,412,054 | 11/1968 | Milligan et al. | 260/18 |
| 3,480,592 | 11/1969 | Dieterich et al. | 260/77.5 |
| 3,565,844 | 2/1971 | Grace et al. | 260/29.2 |
| 3,695,924 | 10/1972 | Wagner | 117/76 T |
| 3,705,226 | 12/1972 | Okamoto et al. | 264/162 |
| 3,706,613 | 12/1972 | Tochi et al. | 156/85 |
| 3,708,333 | 1/1973 | Carlson | 117/140 A |
| 3,969,551 | 7/1976 | Ellsworth | 427/282 |
| 4,035,213 | 7/1977 | Thoma et al. | 156/231 |
| 4,046,729 | 9/1977 | Scriven et al. | 260/29.2 TN |
| 4,094,847 | 6/1978 | Huffman et al. | 260/29.4 R |
| 4,137,209 | 1/1979 | Wong et al. | 260/29.6 NR |
| 4,171,391 | 10/1979 | Parker | 427/246 |
| 4,203,883 | 5/1980 | Hangauer, Jr. | 260/29.2 TN |
| 4,233,359 | 11/1980 | Mimura et al. | 428/254 |
| 4,277,380 | 7/1981 | Williams et al. | 260/18 TN |
| 4,299,868 | 11/1981 | Berndt et al. | 427/389.9 |
| 4,332,710 | 6/1982 | McCArtney | 524/591 |
| 4,336,300 | 6/1982 | Lóránt et al. | 428/316.6 |
| 4,420,507 | 12/1983 | Marco | 427/170 |
| 4,452,834 | 6/1984 | Nachtkamp et al. | 427/379 |
| 4,632,960 | 12/1986 | Sato et al. | 525/117 |
| 4,657,957 | 4/1987 | Baumann et al. | 524/245 |
| 4,833,173 | 5/1989 | Spek et al. | 521/72 |
| 4,886,702 | 12/1989 | Spek et al. | 428/308.4 |

FOREIGN PATENT DOCUMENTS

| | | |
|---|---|---|
| 2109171 | 9/1972 | Germany . |
| 2837314 | 3/1979 | Germany . |
| 47-3477 | 1/1972 | Japan . |
| 48-004940 | 2/1973 | Japan . |
| 48-004941 | 2/1973 | Japan . |
| 52-77292 | 6/1977 | Japan . |

*Primary Examiner*—Erma Cameron
*Attorney, Agent, or Firm*—Terry T. Moyer; William S. Parks

[57] ABSTRACT

A process for the production of a fabric/elastomer composite is provided. The inventive process involves the impregnation through a printing procedure of an inventive elastomer composition comprising (i) a water-borne polyurethane latex, (ii) an acid-generating chemical, (iii) a cloud point surfactant, (iv) a thickener, and (v) optionally, a cross-linking agent, within a textile fabric. Subsequently, the impregnated fabric is then heated, preferably with steam, in order to generate an acid, which, in turn, permits the surfactant to gel and uniformly coagulate the latex over the fabric surface. The fabric is preferably a circular knit comprised of polyester and/or lycra fibers. The composite may be utilized within any fabric application requiring a support function, particularly as joint braces, sports brassieres, support apparel, and the like. The inventive elastomer composition is also provided.

12 Claims, No Drawings

PRINT-PATTERNED COAGULATED POLYURETHANE ON FABRIC SUBSTRATES AND ARTICLES MADE THEREFROM

CROSS REFERENCE TO RELATED APPLICATIONS

This application is a continuation-in-part of co-pending application Ser. No. 09/042,922, filed Mar. 17, 1998, for Method of Making a Polyurethane Suede-Like Fabric/Elastomer Composite, to Vogt. The disclosure of the parent application is incorporated herein by reference.

FIELD OF THE INVENTION

This invention relates to a process for producing a fabric material comprising print-patterned gradient stretch coagulated polyurethane which has areas of differing tensile strength, elongation, and recovery. The inventive procedure involves first producing a mixture of at least three ingredients, a polyurethane latex, an acid-generating chemical, and a cloud-point surfactant, printing the mixture to at least a portion of a porous textile substrate, and heating the printed substrate at a time just after printing. The resultant composite obtains an excellent strong elastomeric fabric. The three ingredient pre-mixture is a long-lasting shelf-stable (long pot-life) composition which will not react until it is exposed to sufficient amounts of heat, thus providing a cost-effective improvement over the prior art. The particular produced composites are also contemplated within this invention.

DISCUSSION OF THE PRIOR ART

Polyurethane latices have been utilized in a variety of ways, most notably as coatings or finishes on fabric surfaces. Such latices provide, for example, a barrier to potentially damaging environmental conditions.

Past polyurethane coagulant products included composites produced through the reaction of a polyurethane latex and an acid-generating chemical, and specifically hydrofluorosilicic salts. Such a composition is disclosed within U.S. Pat. No. 4,332,710, to McCartney, entirely incorporated herein by reference. Patentee teaches heat-activated coagulation of a polyurethane latex solely in conjunction with an acid-generating chemical, such as salts of hydrofluorosilicic acid. Such a composition and method presents some difficulties, primarily in the use of an acid-generating chemical alone to provide ionic coagulation. This two-component system oftentimes results in a non-uniform distribution in the substrate textile and thus can form stringy structures which are unattractive as suede substitutes. Of particular concern are the environmental and safety issues related to the use of hydrofluorosilicic acid salts, which are presently highly discouraged as reactants in industry, but which are the preferred and, in actuality, only acid-generating chemicals disclosed within patentee's teachings.

Other prior teachings involving polyurethane latex heat-activated coagulation include U.S. Pat. No. 4,886,702, to Spek et al. This patent discloses a method utilizing a composition comprising a waterborne polymer latex, including polyurethane, a cloud point surfactant coagulant, and a foaming agent. However, first of all, such a composition produces a textile having a harsh hand, which is the result of the required foaming effect, and little or no elastomeric properties. Second, the foaming agent is freon, which is being phased out of production due to its deleterious environmental impact. Third, the coagulation process requires secondary acid and/or salt compounds in an aqueous bath which potentially creates a non-uniform coagulant on the substrate surface. Last, the shelf life (or pot life) or patentee's compositions is, at a maximum, only eight hours in duration.

Furthermore, U.S. Pat. No. 4,171,391, to Parker, teaches polyurethane latex coagulation within an aqueous ionic or acid bath. Such a procedure is very difficult to control as the type and amount of ionic material or acid, and thus the rate of diffusion of such a constituent from the bath to the substrate material, is the determining factor. As a result, there is a lack of consistent uniformity of dispersion and coagulation from one textile substrate to another. Particularly concerning heavier fabric substrates, the necessary contact times may be as high as 30 minutes, which translates into high costs for the manufacturer and, ultimately, the consumer.

There is a need, then, for improved fabric/elastomer composites within the industry which are relatively inexpensive to make, which utilize environmentally safe compounds and chemicals within their manufacture, and which obtain an overall better performance over others within the prior art.

DESCRIPTION OF THE INVENTION

It is thus an object of the invention to provide such an improved, more aesthetically pleasing fabric/elastomer composite. A further object of the invention is to provide a relatively inexpensive method of making such a composite. Another object of the invention is to provide a method of producing a fabric/elastomer article which includes environmentally safe, nontoxic, low odor, noncombustible chemicals. Yet another object of this invention is to provide supportive fabric/elastomer composites within all intended uses in which a user requires or desires a product functioning in a support capacity.

Accordingly, this invention concerns a method of making a polyurethane fabric/elastomer composite comprising the sequential steps of (a) providing a textile fabric;
(b) printing at least a portion of said fabric with an elastomer composition comprising
  (i) a water-borne polyurethane latex;
  (ii) a heat-activated acid-generating chemical selected from the group consisting essentially of at least one organic acid ester; and
  (iii) a cloud point surfactant;
  (iv) a thickening agent; and, optionally
  (v) a crosslinking agent;
(c) heating said printed textile to a temperature to effectuate a uniform dispersion and coagulation of said elastomer composition over said textile fabric. Also, the invention concerns the elastomer composition of step (b) of the inventive method, itself.

Nowhere within the prior art has such a specific heat-activated coagulating method utilizing an elastomer composition been disclosed, practiced, or fairly suggested. Such an elastomer composition provides a significant advantage over the two-component (latex and acid-generator) and different three-component (latex, cloud point surfactant, and foaming agent) compositions of the prior art. For instance, the inventive composition has a shelf life (pot life) measured in weeks (at least two weeks of stability and non-coagulation after initial admixing) instead of hours at a temperature as high as about 38° C. (160° F.). The coagulation occurs only after exposure to a heat source of sufficient temperature to effectuate such reactivity (greater than about 82° C. or 180° F.). Furthermore, another improvement over the prior art is the use of only environmentally "friendly" materials throughout the inventive process. For instance, the acid-generating chemicals within the inventive coating composition do not include potentially unsafe hydrofluorosilicic acid salts, and the like. Additionally, the utilization of the cloud point surfactant and the acid-generating chemical facilitates production through the ability to control more effectively the rate and uniformity of the coagulation process. The prior art teachings do not permit such an extensive and beneficial ability to control such reactions. In particular, the inventive method and composition provide a high level of coagulant uniformity within single composite substrates and also allow for uniformity of appearance and performance between many different composites at the large-scale manufacturing level. Yet another improvement available with the inventive method and composition is the use of a strictly aqueous system rather than an organic solvent-based system. Avoidance of organic materials provides less volatility, odor, combustibility, and toxicity as well as increased heat stability for the final product. Of particular interest is the beneficial ability of the inventive composition (being an aqueous system) to be utilized in conjunction with other compatible aqueous chemical systems used in other areas of textile manufacturing. Such adaptability and combinability with other textile manufacturing procedures and materials is a very important benefit, again to reduce the chances of toxic emissions, etc., during textile processing. Additionally, the inventive method and composition impart a fine-structured coagulum finish to fabrics which obtains a greater degree of porosity, in order to transport water more easily, then dried polyurethane fabric coatings, which also obtains a beneficial tensile strength in order to provide a support function within the fabric substrate. Finally, the coagulated heat-treated latex provides softer feel and more desirable aesthetics than latices which are merely dried after print-patterning on the subject substrate.

The desired tensile strength properties are only obtained where the polyurethane has been printed on the fabric; the remaining unprinted substrate retains the same properties as is characteristic of such fabrics. Thus, the inventive method and composition provide the means to produce, in a very safe manner, a fabric/elastomer composite which can be utilized effectively within medical devices, such as joint braces and athletic braces, and apparel, such sports brassieres and swimwear, all as merely examples, and all which provide a support function for a wearer. Such a support function thus replaces the cost involved with more expensive rigid composites or metal components with a relatively low-cost, high tensile strength, yet high elongation, fabric. Again, the coagulant provides the tensile strength characteristics over the printed area which, preferably, outlines the desired supported, elongation area.

The term fabric/elastomer composite means an article comprised of a textile fabric which has been coated with an elastomer composition. As noted above, the inventive elastomer composition comprises at least four materials, a water-borne polyurethane latex, an acid-generating chemical, a cloud point surfactant, a thickening agent (to manipulate the viscosity of the polyurethane printing solution), and, optionally, a crosslinking agent (in order to increase washfastness for the fabric coating). Any water-borne polyurethane latex may be used; however, the preferred latices are those having at least a 40% solids content, with greater than 50% solids content being more preferred, and higher than 65% being the most preferred. One preferred example of such a latex is Witcobond W-293 (67% solids) polyurethane latex, available from Witco. The water-borne criteria is of utmost importance within this invention primarily to insure that potentially environmentally harmful organic solvents are not present within the elastomer composition.

The term heat-activated acid-generating compound denotes a chemical which is not an acid at room temperature, but which, upon exposure to a heat source, produces an acid. The particularly suitable class of compounds which both meet this description and provide the best results with little or no deleterious environmental impact are organic acid esters. Some specific types of such compounds include ethylene glycol diacetate, ethylene glycol formate, diethylene glycol formate, triethyl citrate, monostearyl citrate, a proprietary organic acid ester available from High Point Chemical Corporation under the tradename Hipochem AG-45, and the like. The preferred species is ethylene glycol diacetate, available from Applied Textile Technologies as APTEX™ Donor H-plus.

The term cloud point surfactant is intended to encompass any surface-active agent which, upon exposure to higher temperatures, becomes less water soluble. Such a surfactant easily binds with the polyurethane latex upon gelling and facilitates the uniform coagulation of the latex over the entire contacted textile substrate. Specific surfactants meeting such a limitation include poly(ethylene) oxides, poly (ethylene/propylene) oxides, polythio ethers, polyacetals, polyvinylalkyl ethers, organopolysiloxanes, polyalkoxylated amines, or any derivatives of these listed compounds, with the preferred being polyalkoxylated amines, available from Clariant under the tradename Cartafix U™.

The thickening agent may be any water-soluble thickener including, and not limited to, alginates (and other natural gums), methylcellulose, carboxymethylcellulose, hydroxypropyl methylcellulose (and other cellulosic compounds), polyacrylic acids and their corresponding salts, polyurethane thickeners, polyvinyl alcohol, acrylate polymers, and the like. Kelgin, a natural gum alginate thickener is most preferred. Such a thickener aids in increasing the viscosity of the printing polyurethane elastomer composition to provide beneficial printing conditions on the substrate fabric surface. Without such a thickener, the elastomer composition would be difficult to control and print-patterning of the elastomer composition on the fabric surface would be nearly impossible. Thus, the thickener facilitates the coating of the actual areas of the subject fabric which require support due to the tensile strength accorded the fabric by the inventive elastomer composition.

The crosslinking agent may be any number of well known curing agents, such as, as merely examples, melamine/formaldehyde resins, carbodiimides, polyaziridenes, and epoxy resins. Melamine/formaldehyde resins are the most preferred. This additive, when utilized, is present in amounts of from about 0.1 to about 5% of the total weight of the solids content within the elastomer composition, preferably from about 1 to about 3%, and most preferably about 1.5%. Such a cross-linker may be utilized to produce a coating having a very high average molecular weight which thus effectively coats and adheres to the fabric surface. Such a high molecular weight coating appears to provide excellent washfastness for the overall latex fabric coating.

The proportions required within the inventive elastomer composition are based upon the ratio of weights between the latex and each of the remaining components. For instance, the polyurethane must have water present in order for the inventive method to function properly. It has been found that a weight ratio of latex to water of from about 1:30 to about 3:1 provides sufficient moisture within the reaction itself to commence a suitable fabric treatment. Furthermore, weight ratios of form 40:1 to about 100:1, and preferred ranges of from about 40:1 to about 50:1, are suitable between the latex and each of the individual remaining components, namely the acid-generator and the cloud point surfactant.

The textile fabric utilized within the inventive process may comprise any synthetic or natural fiber or blend of such fibers, particularly in combination with lycra fabric. As merely examples, and not intended as limitations, the textile fabric may be constructed from lycra alone or with any combination of lycra and the following: fibers of polyester, nylon (–6 or –6,6), cotton, polyester/cotton blends, wool, ramie, silk, and the like. The preferred substrates are comprise lycra/cotton, lycra/polyester, and lycra/nylon blends and polyester. Also, the textile fabric may be of woven, non-woven, or knit construction with a knit fabric being the preferred type and a circular knit being the most preferred.

The printing step may be accomplished through any well known coating or impregnation procedure. Included, without any limitation intended, within this step are brush-application, gravure printing, rotary printing, screen printing, stationary screen printing, dipping/padding, knife coating, roll coating, foam coating, spray coating, and the like. Most preferred is a rotary screen printing procedure. Selected portions of or, if desired, the entire subject textile is printed (impregnated) with the elastomer composition and subsequently heated. This heating step generates the acid and gels the surfactant which then uniformly coagulates the polyurethane latex only over the printed portion of the textile. The temperature required to initiate the reaction depends on the particular acid-generating compound utilized. However, in general, the requisite temperature should be at least 82° C. with a high temperature being about 130° C. The boiling point of water is the preferred temperature, particularly where a steam application, and most preferably a saturated steam (approximately 100° C.–110° C.) application, is utilized. Such conditions are preferred because moist heat (steam) provides the most effective exposure for the elastomer composition. The presence of moisture permits a greater level of control over the reaction since the addition of dry heat generally vaporizes the aqueous portion of the polyurethane latex which promotes the undesirable formation of a continuous polymer film. The latex must remain moist in order for proper and uniform coagulation to ensue. Therefore, the elastomer composition preferably must be heated and simultaneously must remain water-saturated during the entire reaction. Alternatively, the coated fabric may also be exposed to rapid heating by a microwave heat source which does not provide an appreciable loss of moisture to the overall elastomer composition. An exposure time of from about 10 seconds to about 1 minute, in a microwave application, or from about 1 minute to about 10 minutes, in a steam application, may be followed. A steam application for about 2 minutes is preferred.

The utilization of a steam heating step again provides a distinct advantage over the prior art by retaining strictly aqueous solvent reaction conditions. After the steam heating step, the composite is dried with high convective, low temperature (<250° F.) heating or microwave heating in order to prevent continuous film formation on the fabric surface.

To the textile fabric there may be added, either before impregnation or after, preferably before, any standard textile additives, such as dyes, colorants, pigments (including organic and inorganic pigments), fillers (such as inorganic clays and the like), ultra violet absorbers, softening agents, antioxidants, antimicrobial agents, antifungal compounds, flame retardants, microcapsules (such as phase heat-transfer agents and perfumes), and the like.

As mentioned above, the inventive composite may be utilized within and/or as medical braces, swimwear, athletic wear, such as sports bras and supporters, apparel, or utilized as and/or for any other purpose in which a textile requires a tensile strength support area is desired.

DETAILED DESCRIPTION OF THE PREFERRED EMBODIMENT

The preferred embodiment of the inventive method and composition is set forth in the following EXAMPLES.

Aesthetics, Washfastness, and Tensile and Elongation Strength Tests

EXAMPLES 1–5

Comparison of Different Elastomer Compositions

A coagulable latex (elastomer composition) was prepared by first mixing 48.78 g. of Witcobond W-293 polyurethane latex (67% solids), available from Witco, and 1.22 g. Cartafix U™ (cloud point surfactant), from Clariant in a beaker. In a separate beaker, 48.78 g. of water and 1.22 g. of APTEX Donor H-plus (acid-generating chemical), from Applied Textile Technologies, were mixed together. The two mixtures were then blended together and various levels of cross-linking agents were blended within different samples of the pre-blended elastomer compositions. Furthermore, after the addition of the cross-linking agents, 12.5 g. of a 6% (wt.) composition of Kelgin LV (thickening agent) were added to increase the viscosity prior to printing on a 90%polyester/10%lycra knit fabric. The resultant tested mixtures were printed on the subject fabric samples at a 75% dry solids pickup, based on the weight of the fabric (owf) and heated with steam for 5 minutes (215 or about 102° C.) and subsequently dried at a temperature of just below about 250° F. (about 121°). The fabric was tested for washfastness (test for pilling of polyurethane latex after 20 washes), aesthetics, and the tensile strength and recovery at 100% deflection. The different examples are based upon the different type or amount of cross-linker(s) utilized. Crosslinker M3 (a melamine/formaldehyde resin available from Cytec) and catalyst MX (available from Cytec) were added to the elastomer composition. The examples below show the distinction between the subject compositions. Example 6 is the uncoated fabric used as a variable to test the tensile strength and elongation.

TABLE 1

| Example | Cytec M3 (grams) | Cytec MX (grams) | Aesthetics | Washfastness |
| --- | --- | --- | --- | --- |
| 1 | 0 | 0 | soft | significant pilling |
| 2 | 0.1 | 0.1 | soft | small pilling |
| 3 | 0.25 | 0.25 | soft | small pilling |
| 4 | 0.5 | 0.5 | soft | minimal pilling |
| 5 | 1.0 | 1.0 | harsher feel | no pilling |
| 6 (no latex added) | 0 | 0 | fabric alone | standard |

EXAMPLE 4 provided the best washfastness and aesthetics and thus is the most preferred formulation for the inventive elastomer composition, although each of EXAMPLEs 1–5 are preferred compositions and resultant articles. The tensile strength of EXAMPLEs 1–5 was about 2.8 lbs/in$^2$ and the tensile strength of EXAMPLE 6 was about 0.67 lbs/in$^2$. After 10 100% deflections for each of the EXAMPLEs, the tensile strength stabilized at about 1.8 lbs/in$^2$ for EXAMPLEs 1–5 and about 0.60 lbs/in$^2$ for EXAMPLE 6. The crosslinker additions thus did not provide an appreciable increase in tensile strength and recovery, but did provide better washfastness for the polyurethane latex.

Air Permeability and Water Transport Testing

EXAMPLE 7 (Comparative)

The fabric coated with the composition of EXAMPLE 1, above, was tested for air permeability in order to estimate the coated fabric's ability to transport water. A comparison fabric was coated with a mixture of 50 g. Witcobond W-293 Polyurethane latex (67% solids), 50 g. water, and 12.5 g. of a 6% (wt) Kelgin LV thickener. This mixture was applied to the subject fabric but without steam treatment prior to drying. Aesthetics were tested as above (by hand and by sight) and the air permeability for each sample was tested with a Textest FX3300 instrument, #5 orifice, instrument at 125 Pa of pressure. The results of aesthetics tests and air permeability test are tabulated below:

TABLE 2

| Example | Aesthetics | Air Permeability |
| --- | --- | --- |
| 1 | soft | 10.1 cfm (2.1 cfm standard deviation) |
| 7 | harsh and abrasive | 0.9 cfm (0.4 cfm standard deviation) |

The air permeability of inventive EXAMPLE 1 was an order of magnitude higher than that for comparative EXAMPLE 7, thus providing a much better method of transporting water, for instance, away from a person's body. These tests also evince the importance of a heat treatment (preferably a steam treatment) of the printed polyurethane latex upon the subject fabric.

Application on Sports Brassieres

EXAMPLES 8–15

Comparison of Coated and Uncoated Brassieres composition of EXAMPLE 4, above, was then brush-printed around the breast cups on several different types of bras for further testing as to support. The dry solids addition was approximately 75%, as above, and the samples were steam treated, as above, and subsequently dried at the same temperature, as above. The test subjects were asked for their opinions regarding the support provided by the modified bras as compared to the same types of unmodified bras. The results were measured by comparing the support function of the uncoated fabric with the coated bra and are tabulated as follows:

TABLE 3

| Example | Type of Brassiere | Coated? | Support Test |
| --- | --- | --- | --- |
| 8 | NIKE ® Dir Fit Bra, size XL | No | Supportive |
| 9 | same as EXAMPLE 8 | Yes | More Supportive |
| 10 | BASIC EDITIONS Tank Top Bra XL | No | Supportive |
| 11 | same as EXAMPLE 10 | Yes | More Supportive |
| 12 | CHAMPION ® Action Shape #106C5 | No | Supportive |
| 13 | same as EXAMPLE 12 | Yes | More Supportive |
| 14 | CHAMPION ® Action Shape #107C5 | No | Supportive |
| 15 | same as EXAMPLE 14 | Yes | More Supportive |

There are, of course, many alternative embodiments and modifications of the present invention which are intended to be included within the spirit and scope of the following claims.

What we claim is:

1. A method of making a polyurethane fabric/elastomer composite comprising the sequential steps of
    (a) providing a textile fabric;
    (b) impregnating said textile fabric with a elastomer composition comprising
        (i) a water-borne polyurethane latex;
        (ii) a heat-activated acid-generating chemical selected from the group consisting essentially of at least one organic acid ester;
        (iii) a cloud point surfactant;
        (iv) a thickening agent; and, optionally
        (v) a crosslinking agent; and
    (c) heating said impregnated textile fabric to a temperature to effectuate a uniform dispersion and coagulation of said elastomer composition over said textile fabric.

2. The method of claim 1 wherein the fabric textile comprises natural fibers, synthetic fibers, or blends thereof.

3. The method of claim 2 wherein the fabric textile comprises fibers of polyester, nylon, cotton, wool, ramie, lycra, and any blends thereof.

4. The method of claim 3 wherein the fabric textile comprises at least an amount of polyester fibers.

5. The method of claim 3 wherein the fabric textile comprises at least an amount of lycra fibers.

6. The method of claim 1 wherein heating step (c) is performed at a temperature of from about 82° C. to about 130° C.

7. The method of claim 6 wherein heating step (c) is performed under saturated steam conditions at a temperature of from about 100° C. to about 110° C.

8. The method of claim 6 wherein heating step (c) is performed by exposing the impregnated textile fabric to steam for a duration of between about 1 minute and about 10 minutes.

9. The method of claim 8 wherein heating step (c) lasts about 2 minutes in duration.

10. The method of claim 1 wherein the heat-activated acid-generating chemical (ii) of step (b) is ethylene glycol diacetate.

11. The method of claim 1 wherein the elastomer composition of step (b) comprises
(i) a water-borne polyurethane latex comprising
(a) a polyurethane latex; and
(b) water;
(ii) at least one organic acid ester heat-activated acid-generating chemical; and
(iii) at least one cloud point surfactant;
(iv) at least one thickening agent; and
(v) optionally, at least one cross-linking agent; wherein the weight ratio of (i)(a) to (i)(b) is from about 1:30 to about 3:1;

the weight ratio of (i)(a) to (ii) is from about 40:1 to about 100:1;

the weight ratio of (i)(a) to (iii) is from about 40:1 to about 100:1; and the weight ratio of (i) to (iv) is from about 100:1 to about 50:1.

12. The method of claim 11 wherein the weight ratio of (i)(a) to (ii) is from about 40:1 to about 50:1; and the weight ratio of (i)(a) to (iii) is from about 40:1 to about 50:1.

* * * * *